US005691692A

United States Patent [19]

Herbstritt

[11] Patent Number: 5,691,692

[45] Date of Patent: Nov. 25, 1997

[54] PORTABLE MACHINE WITH MACHINE DIAGNOSIS INDICATOR CIRCUIT

[75] Inventor: Dale R. Herbstritt, Clemmons, N.C.

[73] Assignee: Ingersoll-Rand Company, Woodcliff Lake, N.J.

[21] Appl. No.: 591,331

[22] Filed: Jan. 25, 1996

[51] Int. Cl.[6] .......... B60Q 1/00

[52] U.S. Cl. .......... 340/438; 340/439; 340/459; 340/431; 123/198 D; 123/198 DB; 123/198 DC

[58] Field of Search .......... 340/438, 439, 340/459, 431; 123/198 D, 198 DB, 198 DC; 361/153

[56] References Cited

U.S. PATENT DOCUMENTS

| | | | |
|---|---|---|---|
| 2,037,748 | 4/1936 | Zahodiakin | 340/438 |
| 4,502,090 | 2/1985 | Sloan | 361/153 |
| 4,727,353 | 2/1988 | Ruhter | 340/439 |
| 4,890,088 | 12/1989 | Woodell | 340/459 |
| 4,899,706 | 2/1990 | Sasaki | 123/198 D |
| 4,995,357 | 2/1991 | Gonnering et al. | 123/198 DC |

*Primary Examiner*—Jeffery Hofsass
*Assistant Examiner*—Sihong Huang
*Attorney, Agent, or Firm*—Michael M. Gnibus

[57] ABSTRACT

A portable machine having a frame and an engine supported by the frame, the engine having a power source and an engine cutoff device connected to the engine. In combination with the machine is a machine diagnosis circuit comprised of at least one protective switch connected in series with the engine power source and the engine cutoff device. The circuit also includes a diagnosis indicator combination wired across each of the at least one protective switches, the diagnosis indicator combination is comprised of an LED pair and resistor. In order to provide an indication of a machine problem, an indicator panel is located along the outside of the machine. The panel overlays the LED pairs and includes at least one icon which is illuminated by the LED pair to provide an outside readable graphical indication of the existence and location of the machine problem.

10 Claims, 4 Drawing Sheets

PORTABLE MACHINE WITH MACHINE DIAGNOSIS INDICATOR CIRCUIT

FIELD OF THE INVENTION

This invention generally relates to a portable machine such as a fluid compressor, light tower or a generator which has a machine diagnosis indicator circuit, and more particularly the invention relates to a machine diagnosis indicator circuit for a portable machine where the indicator circuit includes an indicator comprised of a Light Emitting Diode (LED) pair.

DESCRIPTION OF THE PRIOR ART

Engine-driven fluid compressors, generators and light towers collectively referred to herein as "the portable machines" or "machines", include protective shutdown circuits which are used to continuously check a number of machine operating parameters during operation of the machine. The circuits are used to shutdown the machine if there is a problem during operation. The types of parameters associated with such protective shutdown circuits may be air temperature, engine temperature, fuel level, water level, and oil pressure.

Prior art portable machines are provided with a number of diagnostic circuits and each circuit is associated with a different engine operating parameter. Each circuit includes a protective switch that is actuated if the associated machine operating parameter falls out of a predetermined acceptable operating range. The protective switches may be series-wired in a manner well known in the art so that if one switch is opened, power to the engine is terminated causing the machine engine to shutdown, and the associated portable machine driven by the engine is likewise shutdown. Another known protective circuit includes a relay contact that is normally closed in order to power the machine engine. The protective switches are parallel wired so that if one switch is actuated power to the relay coil is affected, causing the machine to shutdown. In this way, the protective switches serve to prevent damage to the machine due to an out-of-range machine operating parameter.

The majority of prior art portable machines include a fuel solenoid that opens to permit a fuel such as gasoline to be supplied to the engine during machine operation. The switches of a number of protective circuits are either series-wired with the fuel solenoid or parallel-wired to control a series wired relay contact so that if one of the machine operating parameters falls outside an acceptable predetermined operating range, the associated protective switch will be actuated terminating the supply of electrical power to the fuel solenoid. Such known systems include a single indicator light that is illuminated by a relay contact when there is a machine operating problem and the switch is opened. Since such known systems only include a single incandescent-type indicator light, the machine operator is not informed what specific protective switch opened and caused the shutdown. More importantly, the operator is not informed what machine operating parameter is out of the acceptable operating range. The light is illuminated when the switch is opened however, because of the circuitry of the prior art machines, the light does not stay illuminated when the machine is shutdown. Another shortcoming of known machines is that when the light is illuminated, it may not be readable in all environments where the machine is used, and may not be visible during daylight use.

In an effort to overcome shortcomings in known protective circuits, some portable machines are provided with a number of diagnostic lights, one light associated with each protective switch. When there is an operating problem in the portable machine, the associated switch is opened and the respective light is illuminated. Such circuits include more complicated electronic circuitry and protection for such circuitry such as noise suppression filters and the like. These systems are quite complex and expensive to manufacture.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a portable machine having a frame and an engine supported by the frame, the engine has a power source and a cutoff device connected to the engine. In combination with the machine is a machine diagnosis circuit comprised of at least one protective switch connected in series with the engine power source and the engine cutoff device. Each of the at least one switches is associated with an machine operating parameter. The circuit also includes a diagnosis indicator combination wired across each of the at least one protective switches, the diagnosis indicator combination is comprised of an LED pair and a resistor. In order to provide a readily visible indication of a machine operating problem, an indicator panel is located along the outside of the machine. The indicator panel overlays the LED pairs and includes at least one icon for each of the LED pairs. Each icon is illuminated by the associated LED pair to provide graphical indication of the existence and location of the operating problem.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION OF THE PREFERRED EMBODIMENT

Figure 1:
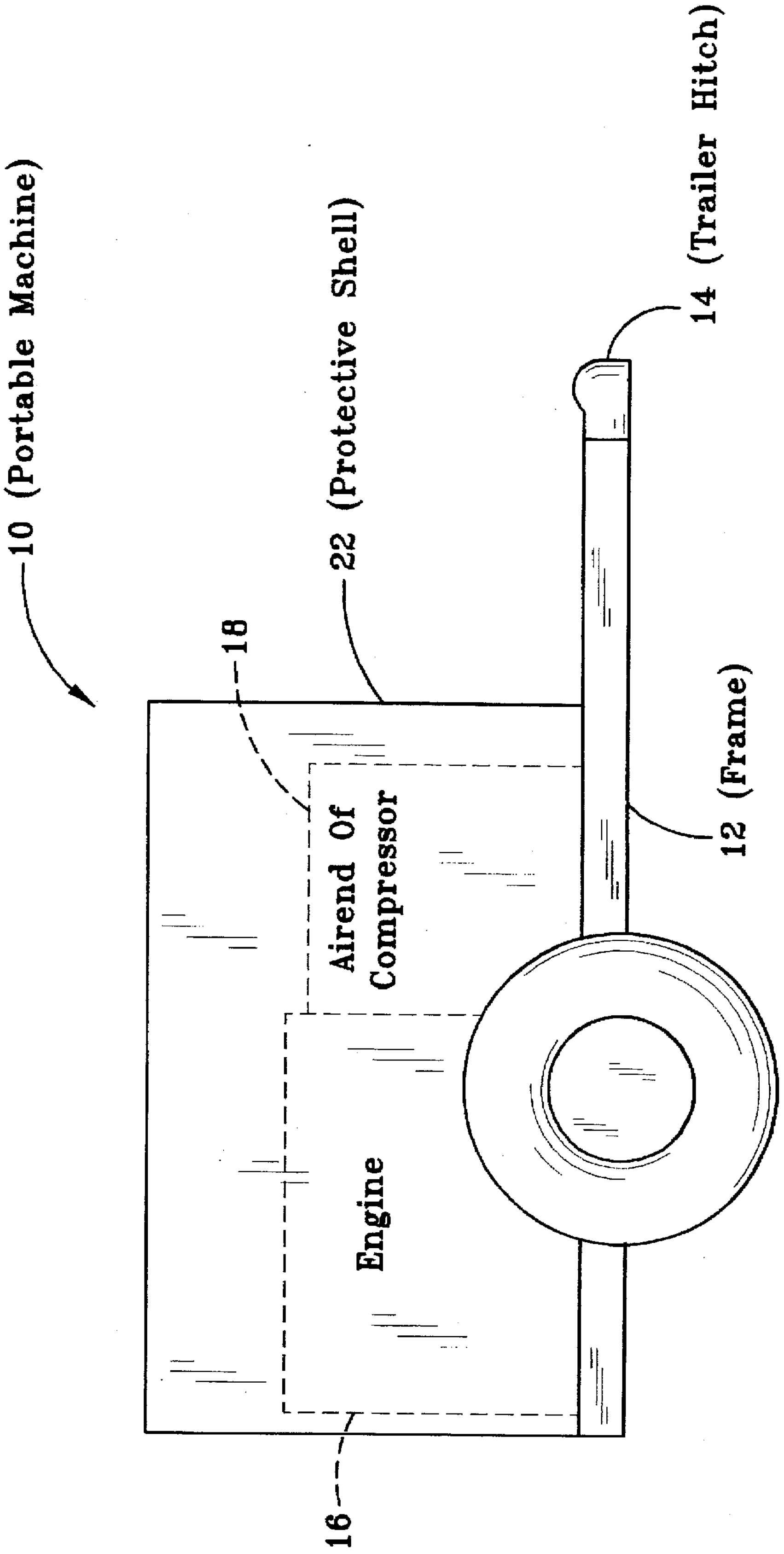
FIG. 1 is a schematic representation of a portable machine that includes the present invention.

Referring now to the drawings, wherein similar reference characters designate corresponding parts throughout the several views, FIG. 1 schematically shows a portable machine 10 which is adapted to be towed between construction sites or other locations where use of the machine is required. The machine 10 includes a frame 12 which has a trailer hitch 14 or other means for connecting the machine to a truck or another suitable towing vehicle. The trailer hitch is located at one end of the frame. The portable machine shown schematically in FIG. 1 may be any portable type machine, including, but not limited to a fluid compressor, a light tower or a generator.

Figure 2:
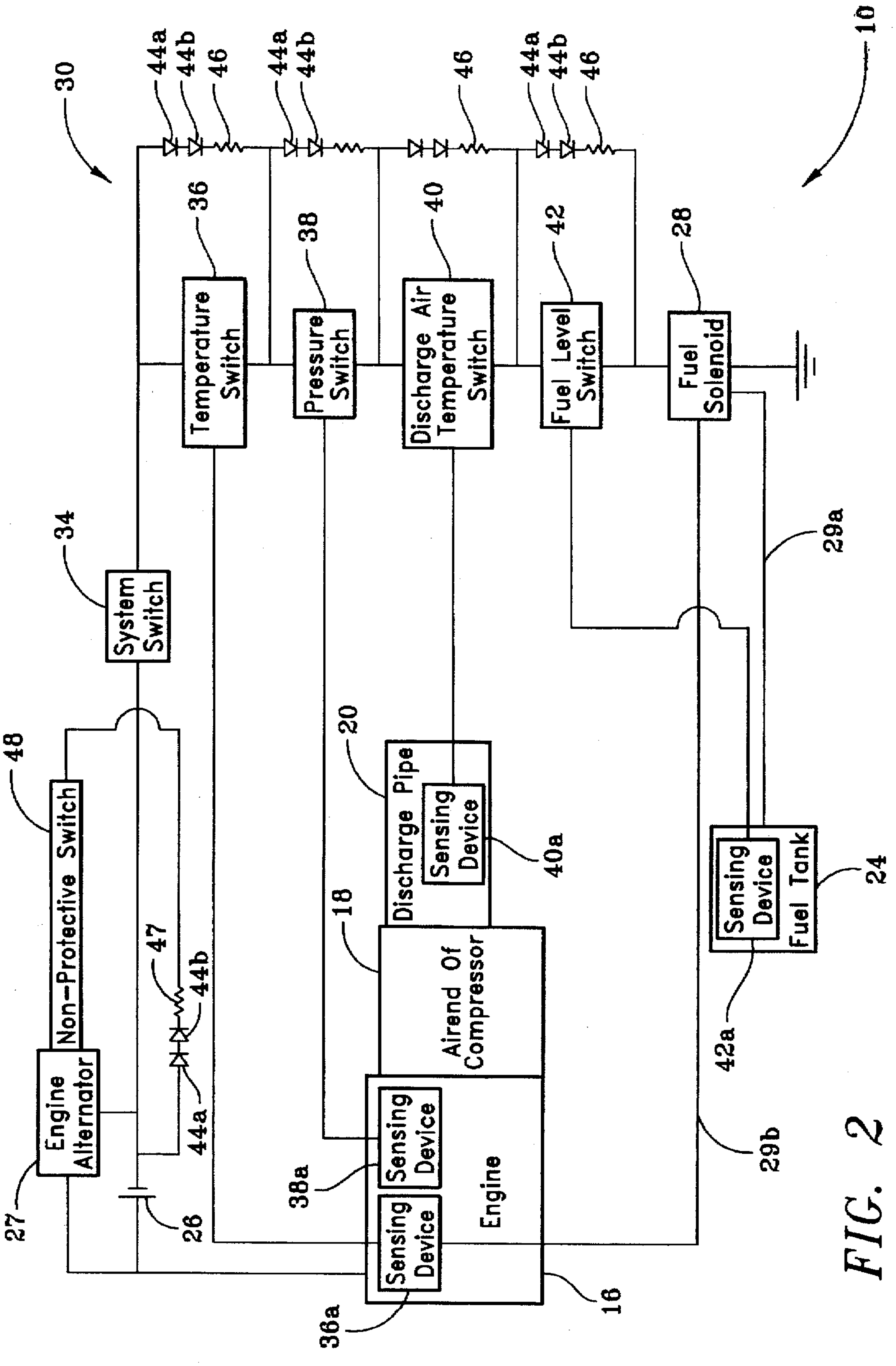
FIG. 2 is a schematic representation of the machine diagnosis circuit of the present invention.

The portable machine is driven by an engine 16 which is supported by frame 12. The engine may be powered by any suitable conventional means including gasoline, diesel fuel, or electricity. As the description proceeds for the purpose of disclosing a preferred embodiment of the invention, the engine will be a diesel engine and the portable machine will be a fluid compressor. The compressor may be a conventional screw-type compressor that is well known to one skilled in the art with an airend 18 that is connected to the engine to be driven by the engine. As shown in FIG. 2, the compressor includes a discharge pipe or conduit 20 for flowing compressed gas, such as air, from the compressor to an object of interest. A conventional protective shell or shroud 22 encloses the engine and airend.

Engine fuel is stored in a conventional fuel tank 24 and the required electrical power is supplied to the engine by conventional battery 26 which is charged during operation by an alternator 27. A fuel line 29*a* joins the fuel tank and electrically actuated fuel solenoid 28 and fuel line 29*b* joins the solenoid with engine 16. In this way, fuel is supplied to the engine when the solenoid is opened. The solenoid is grounded by the machine frame. In the preferred embodiment, the fuel solenoid acts as a means for providing and terminating power to the engine however it is contemplated that in another embodiment with an electrically powered engine the power terminating means may be a circuit breaker.

Machine 10 is provided with a machine diagnosis indicator circuit 30 shown schematically in FIG. 2. The circuit is supported by the machine in a conventional manner, well known to one skilled in the art and illuminates at least one LED pair when a machine operating problem is diagnosed by the circuit. Also provided in the machine 10 is a means for indicating specifically where the operating problem is located. In the preferred embodiment, the indicating means is an indicator panel 32 (FIG. 3), that may be mounted on the shroud 22 or frame 12. The panel includes at least one translucent icon member that is illuminated by an associated LED pair when the machine operating problem corresponding to the icon is present.

Turning now to FIG. 2, machine diagnosis indicator circuit 30 includes a three-way switch 34 that is electrically connected to the engine battery 26. The switch may be moved to a start position to start the engine 16 and also may be used to energize and de-energize the diagnosis indicator circuit 30.

At least one machine protective switch is series wired with the system switch 34 and the fuel solenoid 28. As shown in FIG. 2, the circuit 30 of the present invention includes a protective switch series chain comprised of four protective switches 36, 38, 40 and 42 series wired together so that if one switch is opened, power to the fuel solenoid 28 will be interrupted. The switches are conventional single-pole switches well known to one skilled in the art. Four switches are disclosed for purposes of describing the preferred embodiment of the invention however it should be understood that any number of switches may be used. Each switch is associated with a particular machine operating parameter and is programmed with predetermined acceptable operating values for the parameter so that during operation of the machine, if the parameter falls outside the predetermined acceptable value the switch will open. Switch 36 is associated with engine temperature, switch 38 is associated with engine oil pressure, switch 40 is associated with discharge air temperature and switch 42 is associated with fuel level. Conventional sensing devices 36*a*, 38*a*, 42*a*, and 40*a* shown schematically in FIG. 2, are located in the desired locations along the engine 16, fuel tank 24 and discharge conduit 20 and each sensing device is connected to the respective switch by a wire or other suitable means.

Figure 3:
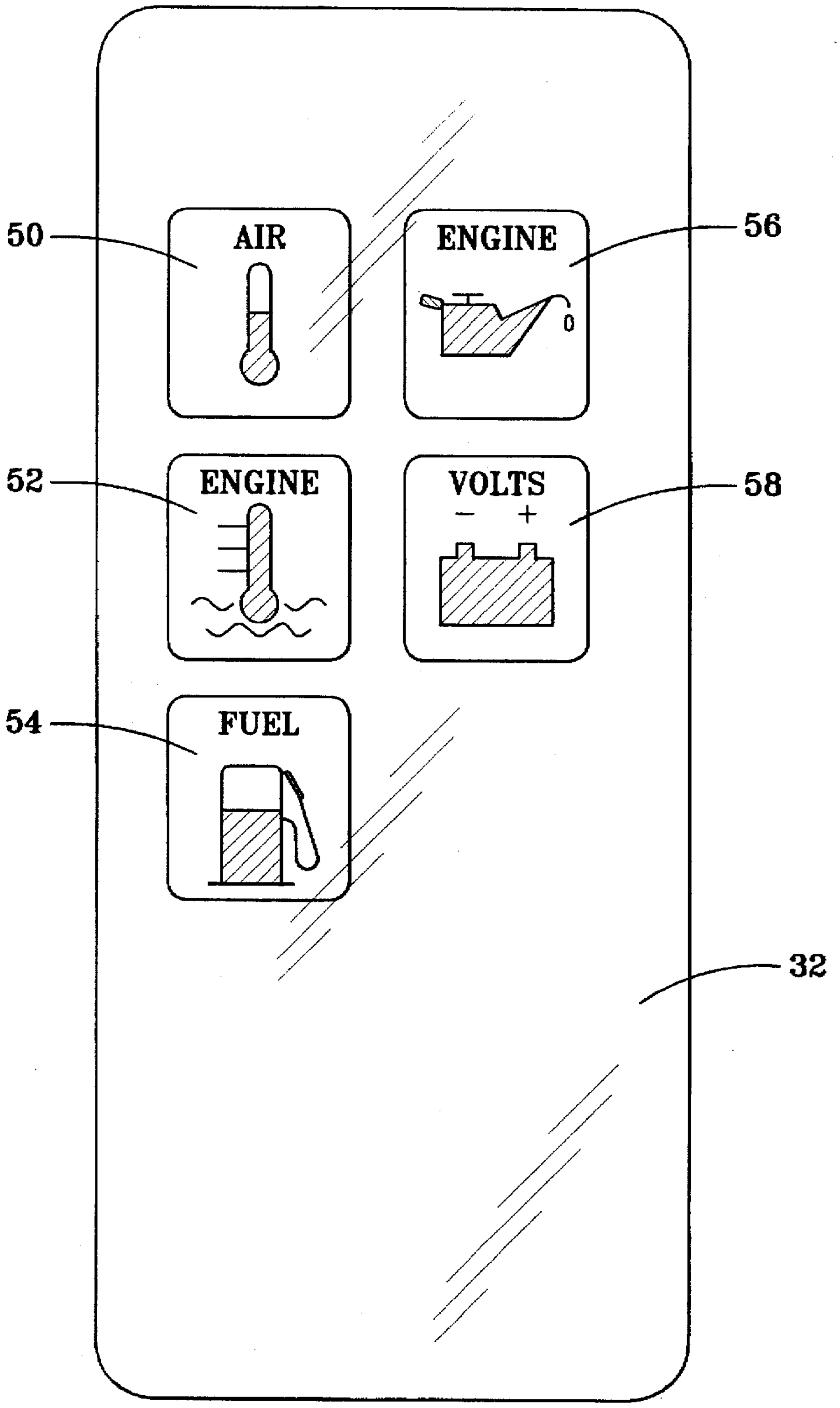
FIG. 3 is a front view of the indicator panel of the present invention.

An indicator combination comprised of an LED annunciator pair 44*a* and 44*b* and a resistor 46 is wired in parallel with each of the switches 36, 38, 40 and 42 as shown in FIG. 2. The current that flows through and illuminates each LED pair is limited by the resistor. A pair of LED annunciator is necessary to light the icons on panel 32 (FIG. 3). However only one LED annunciator may be used if sufficient to fully illuminate an icon. An indicator combination is wired across each of the switches so that if one of the switches is opened, current flows through the LED pair and illuminates the pair. Each LED annunciator is a super high brightness LED with a rating of 2000–3500 millicandella. Using a super high brightness LED permits the illuminated LED to be visible in all machine operating environments including bright sunlight during daytime operation of the machine. The preferred resistor 46 is a 270 ohm resistor.

Resistors are selected to enable adequate current flow to illuminate a maximum of two LED annunciator pairs across two protective switches with 12 V DC power input. At the same time, maximum current specifications for the LED annunciator pair are not exceeded should only one pair be illuminated.

Machine 10 includes at least one non-protective switch 48. The non-protective switch shown in FIG. 2 is associated with engine alternator 27 and is integral with the alternator. An indicator combination comprised of LED annunciator pair 44*a* and 44*b* and a resistor 47 are wired through switch 48 so that actuating the switch will cause current to flow through the LED pair and illuminate the pair. Like the indicator combination associated with switches 36–42, only one LED annunciator may be used if it is sufficient to illuminate control panel icons. The preferred resistor 47 is a 390 ohm resistor. The switch 48 is made integral with the alternator and is actuated if the battery charge falls below a predetermined acceptable value. Because the switch 48 is not series wired with the protective switches, the engine does not shut down when switch 48 is actuated and closed.

Indicator panel (FIG. 3) 32 includes translucent icons 50, 52, 54, 56, and 58. Each of the icons overlays a respective indicator combination. The icons graphically represent the different machine parameters monitored by machine diagnosis circuit 30. Icon 50 is a combination of a thermometer with the word "AIR" and when illuminated signals high discharge air temperature. The icon 50 overlays the indicator combination associated with switch 40. Icon 52 is a combination of a thermometer partially immersed in a fluid with the word "ENGINE" and represents high engine temperature and overlays the indicator combination associated with engine temperature switch 36. Icon 54 is a fuel pump in combination with the word "FUEL" and signifies a low fuel level and overlays the indicator combination associated with switch 42. Icon 56 is an oil can in combination with the word "ENGINE" signals low oil pressure and overlays the indicator combination associated with oil pressure protective switch 38. Icon 58 is a battery in combination with the word "VOLTS" and signals low battery voltage and overlays the indicator combination associated with switch 48. When an LED pair is illuminated, the icon which overlays the LED pair will be illuminated and visible to the machine operator and the machine operator will know specifically what the machine problem is and also where the problem is located.

Figure 4:
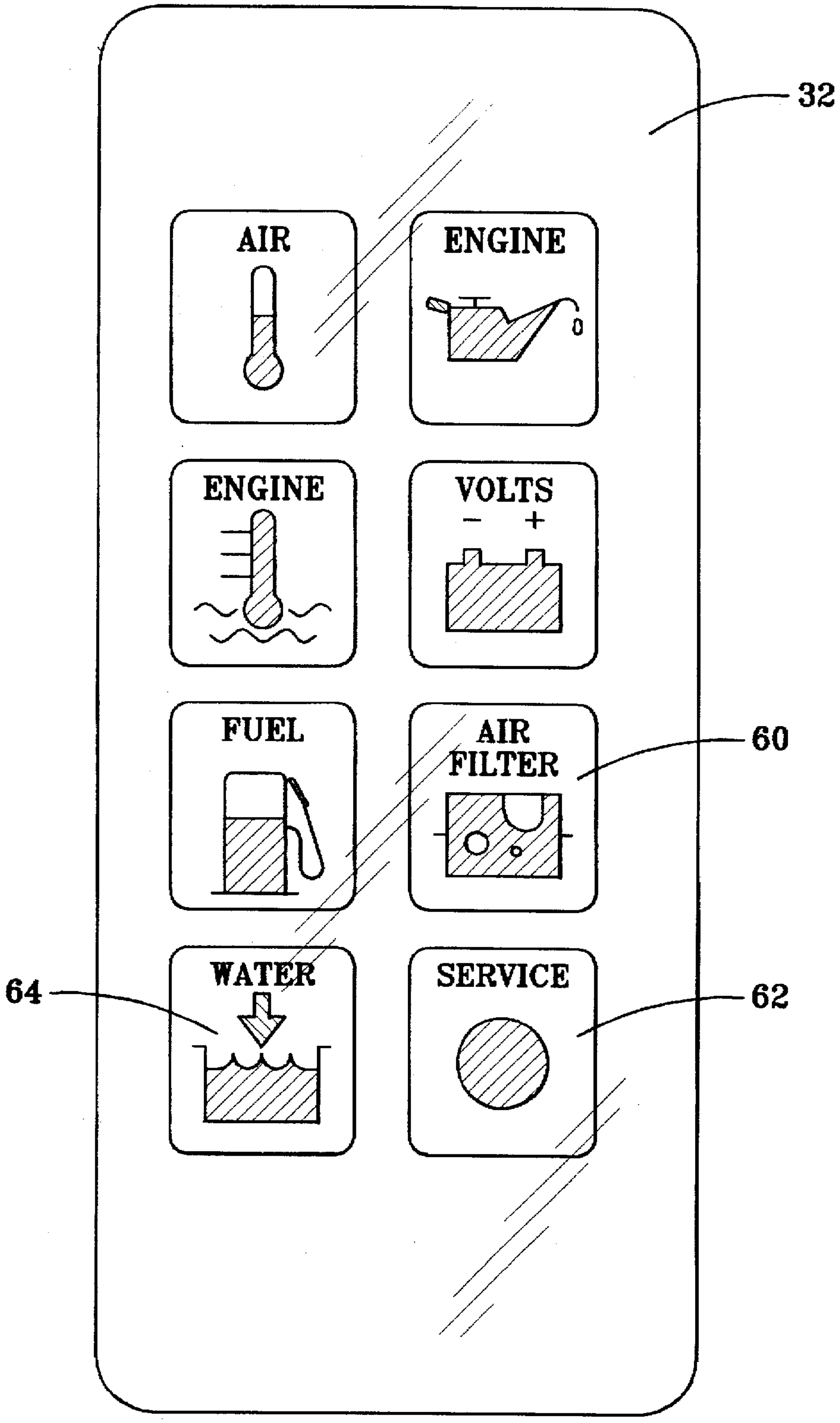
FIG. 4 is an indicator panel like the indicator panel of FIG. 3 with additional icons included on the panel.

Additional icons may be added to the indicator panel 32. For example, as shown in FIG. 4, icons 60, 62 and 64 associated with engine air filter, general engine service and water level respectively may be added. Each icon 60, 62, and 64 is associated with a non-protective switch and indicator combination like switches 36–42. The switches associated with icons 60, 62 and 64 are single-pole switches. Each indicator combination associated with icons 60, 62 and 64 is series wired with the switch (not shown) associated with the icon. When a machine operating parameter falls outside an acceptable range, the respective switch is closed and the associated icon 60, 62 or 64 is illuminated. The non-protective switches associated with icons 60, 62, and 64 are not series wired with the chain of protective switches 36–42 so that if one of the non-protective switches is closed, the engine will not shut down. Any number and combination of icons may be provided on panel 32 for a particular machine.

The circuit 30 may include a conventional relay which allows the machine operator to momentarily activate all the LED annunciators to test the LED's during machine power-up and make sure they will illuminate if required.

Operation of machine 10 and associated circuit 30 will now be described. After initial startup of machine 10, all the protective switches are closed and non-protective switch 48 is open. The non-protective switch is open and does not energize the LED annunciator pair. Power is supplied by battery 26 to the series chain of protective switches to provide adequate power to machine fuel solenoid 28. During operation of engine 16, when a system operating parameter associated with any of the protective switches 36, 38, 40 and 42 is out of acceptable range, the respective protective switch is opened and the respective LED pair is illuminated, making the associated icon visible.

The power to the fuel solenoid is interrupted by the opening of any of the protective switches. Upon opening of at least one of the protective switches, current that flows through and activates each LED annunciator pair limited by the resistor, flows through the solenoid 28 to the ground connection. However this current is insufficient to power the fuel solenoid resulting in cutoff of fuel to the engine and then machine shutdown. The circuit 30 is functional even though the machine is shutdown, and the LED pair stays illuminated even though the machine is not running.

When the switch is opened, the LED annunciator pair provides a visible fault condition that is readily visible to the machine operator. The corresponding icon is illuminated indicating specifically the location of the machine problem. A maximum of two protective switches may be opened during any single occurrence of a protective machine shutdown. However it is contemplated that in another embodiment of the present invention, greater than two switches may be opened during any single occurrence.

If during machine operation a machine operating parameter associated with a non-protective switch falls out of a predetermined acceptable range, the associated non-protective switch is closed, illuminating the LED pair and making the associated icon visible. Icons 58–64 are associated with the non-protective switches. The machine does not stop running when the non-protective switch is closed and the icon remains illuminated thereby providing a clearly visible reminder to the machine operator of a specific machine problem.

The invention provides direct indication to the machine operator of the status of the protective and non-protective switches using a simple circuit which includes indicator combinations comprised of an LED annunciator pair and resistor. The circuit of the present invention eliminates potential problems associated with more complex diagnostic circuits including relay latching; alternator, starter and device coil electrical interference effects on electronics; and lamp replacement usually required with incandescent bulbs.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

What is claimed is:

1. A combination comprising:

a) a portable machine having a frame and an engine supported by the frame, the engine having a power source and a means for cutting off power to the engine;

b) a machine diagnosis circuit comprised of at least one protective switch connected in series with the engine power source and said means for cutting off power to the engine, said circuit also including a first diagnosis indicator across the at least one protective switch, the first diagnosis indicator comprising a first LED pair and a first resistor, the first LED pair adapted to be illuminated when the associated at least one protective switch is opened, said circuit also including at least one non-protective switch and a second diagnosis indicator comprising a second LED pair and a second resistor, the second diagnosis indicator is wired through the at least one non-protective switch so that the second LED pair is illuminated when the at least one non-protective switch is closed, the at least one protective switch and the at least one non-protective switch being connected to a sensing means for measuring the value of a machine operating parameter associated with the at least one protective and the at least one non-protective switch; and c) means for indicating the specific location of an engine fault condition, said means for indicating the specific location of an engine fault condition overlaying the first and second diagnosis indicators.

2. The combination as claimed in claim 1 wherein the portable machine is a fluid compressor.

3. The combination as claimed in claim 1 wherein the portable machine is a generator.

4. The combination as claimed in claim 1 wherein the portable machine is a light tower.

5. The combination as claimed in claim 1, wherein the first diagnosis indicator is wired in parallel across one of the at least one protective switch so that if the machine operation is interrupted, the first diagnosis indicator will remain illuminated.

6. The combination as claimed in claim 1 wherein each LED pair of the first and second diagnosis indicators is a super high brightness LED with a rating of 2000–3500 millicandella.

7. The combination as claimed in claim 1 wherein each resistor of the first and second diagnosis indicators has a resistance of 270 ohms.

8. The combination as claimed in claim 1 wherein the indicating means is a control panel mounted on the machine, said control panel including one icon for each of the first and second diagnosis indicators, said icon adapted to overlay the respective first and second diagnosis indicator to be illuminated by the LED pair.

9. The combination as claimed in claim 1 wherein there are four protective switches and four non-protective switches.

10. The combination as in claim 1 wherein the at least one non-protective switch is a single-pole switch.

* * * * *